US005699405A

United States Patent [19]
Suzuki

[11] Patent Number: 5,699,405
[45] Date of Patent: Dec. 16, 1997

[54] MODEM CARD FOR PORTABLE RADIOPHONE

[75] Inventor: Isao Suzuki, Tokyo, Japan

[73] Assignee: NEC Corporation, Tokyo, Japan

[21] Appl. No.: 429,125

[22] Filed: Apr. 26, 1995

[30] Foreign Application Priority Data

Apr. 26, 1994 [JP] Japan ................................. 6-088211

[51] Int. Cl.⁶ .................................................. H04Q 7/20
[52] U.S. Cl. ........................................... 379/58; 375/222
[58] Field of Search ................................. 379/58, 59, 93, 379/98, 357; 375/222; 370/125, 493, 494, 495, 522, 524; 455/89, 348, 349

[56] References Cited

U.S. PATENT DOCUMENTS

| 4,377,860 | 3/1983 | Godbole . | |
|---|---|---|---|
| 5,359,644 | 10/1994 | Tanaka et al. | 379/58 |
| 5,365,576 | 11/1994 | Tsumura et al. | 379/93 |
| 5,559,792 | 9/1996 | Bottoms et al. | 375/222 X |
| 5,594,952 | 1/1997 | Virtuoso et al. | 379/59 |

FOREIGN PATENT DOCUMENTS

| 0501485 | 9/1992 | European Pat. Off. . | |
|---|---|---|---|
| 0561644 | 9/1993 | European Pat. Off. | 375/222 |
| 62-116058 | 5/1987 | Japan . | |

OTHER PUBLICATIONS

"Newton's Telecom Dictionary", 8th. ed., Harry Newton, pp. 659–660, Nov. 1994.

Primary Examiner—Dwayne Bost
Assistant Examiner—William G. Trost
Attorney, Agent, or Firm—Sughrue, Mion, Zinn, Macpeak & Seas, PLLC

[57] ABSTRACT

A communication information signal from a portable radiophone is concurrently decoded by two decoder units to decode data and voice signals. A data signal portion of the information signal is decoded by a data decoder and then a data signal sensor decides whether or not the decoded signal is a normal data signal. Only the normal signal is fed to a signal converter to conduct a code conversion. The resultant signal is outputted from a transmitter circuit. On the other hand, a voice signal portion of the information signal is decoded by a voice decoder and then a voice signal sensor determines whether or not the decoded signal is a normal voice signal. Only the normal signal is sent to a digital-to-analog converter to be transformed into an analog voice signal. Validity of the decoded signal is verified according to, for example, variation in a frequency band and/or amplitude of the decoded signal. Due to the concurrent decoding operation, data and voice signals are efficiently decoded by one modem card at a high speed. There is hence configured a modem card for a portable radiophone capable of concurrently sending data and voice signals to the information terminal.

4 Claims, 2 Drawing Sheets

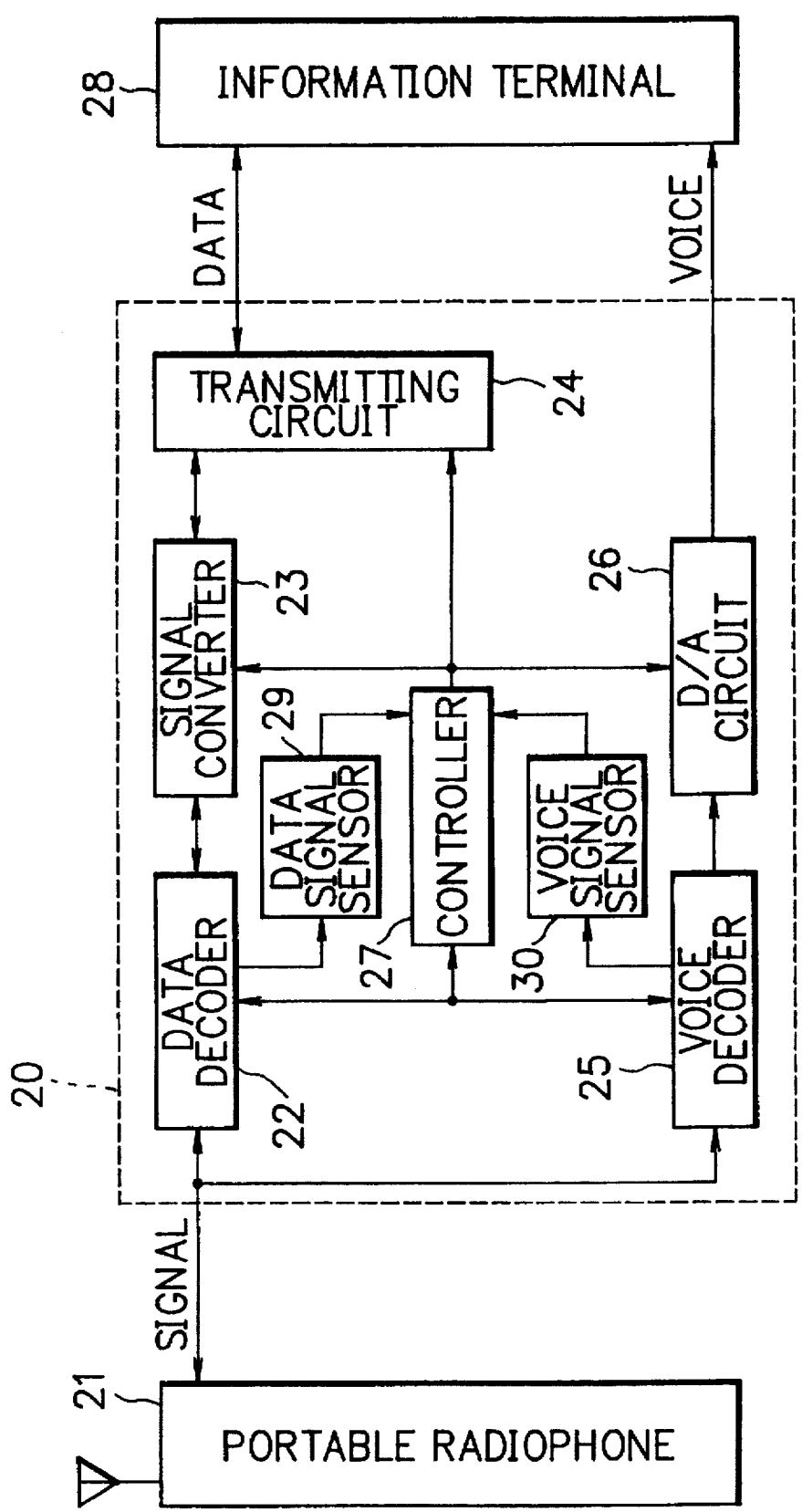

MODEM CARD FOR PORTABLE RADIOPHONE

BACKGROUND OF THE INVENTION

The present invention relates to a modem card for use, with a radiophone, and in particular, to a modem card for use with a radiophone in which received communication information signals are decoded by the radiophone.

DESCRIPTION OF THE RELATED ART

A conventional modem card for use with a radiophone has been configured to suitably transmit data signals. In other words, the conventional modem card is primarily used to communicate data. In general, as shown in FIG. 1, a modem card 10 for use with a radiophone 11 includes a decoding circuit 12 for decoding a data signal portion of the communication information signal from a radiophone 11, a signal converting section 13 for transforming structure of data signals, a transmitting circuit 14 for transmitting the converted signal to a terminal 18, and a control circuit 17 controlling these constituent sections.

According to the Japanese Patent Laid-Open No. Sho-62-116058, there has been described a line terminal unit in which carrier signal sensing means decides whether a communication information signal is a voice signal or data signal so as to conduct a change-over operation between voice call means and modem means.

Moreover, there has been known a technology in which communication of voices is discriminated from data communication to achieve a switching operation between data signals and voice signals.

However, the conventional modem card cannot simultaneously process data and voice signals contained in the communication information signal from the radiophone 11. To overcome this difficulty, after the information signal for voice communication is processed on the radiophone side, the voice signal is converted into the data signal so as to transmit the data signal to the information terminal 18. Such a modem card having a single function cannot flexibly cope with the complicated code system recently used in the field of communications. For example, as already well known, there has been a tendency that information handled by personal computers includes not only information of characters and letters but also voices and images. Such various requirement cannot be satisfactorily covered by the single-functional modem card. In addition, the modem card takes a considerably long period for communications, which leads to a problem of difficulty in the simultaneous transmission of data and voice signals.

Furthermore, the conventional example is based on means or a method in which the change-over operation is conducted for the processing circuit after the received signal is decided to be voice signal or data signal. In consequence, there arises a problem that the change-over operation and communications cannot be effected at a high speed.

SUMMARY OF THE INVENTION

It is therefore an object of the present invention to provide a modem card for use with a portable radiophone capable of concurrently transmitting data and voices to an information terminal such as a personal computer, thereby solving the problems above.

To achieve the object, in accordance with the present invention, there is provided a modem card for use with a portable radiophone connected between a portable radiophone and an information terminal for decoding a communication information signal from the portable radiophone and outputting the decoded signal to the information terminal, including data decoding means for decoding a data signal contained in the communication information signal generated from the portable radiophone, data signal sensing means for deciding whether or not the signal decoded by the data decoding means is a normal data signal, control means for delivering only a signal decided to be the normal data signal by the data signal sensing means from the data decoding means to the information terminal, voice signal decoding means decoding a voice signal contained in the communication information signal generated from the portable radiophone, voice signal sensing means for deciding whether or not the signal decoded by the voice decoding means is a normal voice signal, and control means for delivering only a signal decided to be the normal voice signal by the voice signal sensing means from the voice decoding means to the information terminal. The modem card decodes data and voices.

In addition, the modem card in accordance with the present invention further comprises signal converting means for converting structure of the normal data signal delivered from the data decoding means.

Furthermore, the modem card in accordance with the present invention further comprises signal transmitting means for outputting to the information terminal the data signal of which structure is converted by the signal converting means.

Moreover, the modem card in accordance with the present invention further comprises digital-to-analog converting means for converting the normal voice signal generated by the voice signal decoding means into an analog signal.

In accordance with the present invention, there is provided a modem card for use with a portable radiophone in which a signal of a data portion of a communication information signal produced by a portable radiophone is decoded and the decoded signal is decided to be a normal data signal so as to send only the normal data signal to the information terminal. Furthermore, a voice signal of the communication information signal produced from the portable radiophone is decoded such that the decoded signal is determined to be a normal voice signal so as to transmit only the normal voice signal to the information terminal. Consequently, when processing the communication information signal including data and voice signals, the data and voice can be concurrently decoded by one modem card without conducting the operation in which the data signal is discriminated from the voice signal to effect a change-over operation for decoding means.

BRIEF DESCRIPTION OF THE DRAWINGS

The objects and features of the present invention will become more apparent from the consideration of the following detailed description taken in conjunction with the accompanying drawings in which:

FIG. 2 is a block diagram showing an embodiment of the modem card for a portable radiophone in accordance with the present invention.

DESCRIPTION OF THE PREFERRED EMBODIMENTS

Figure 1:
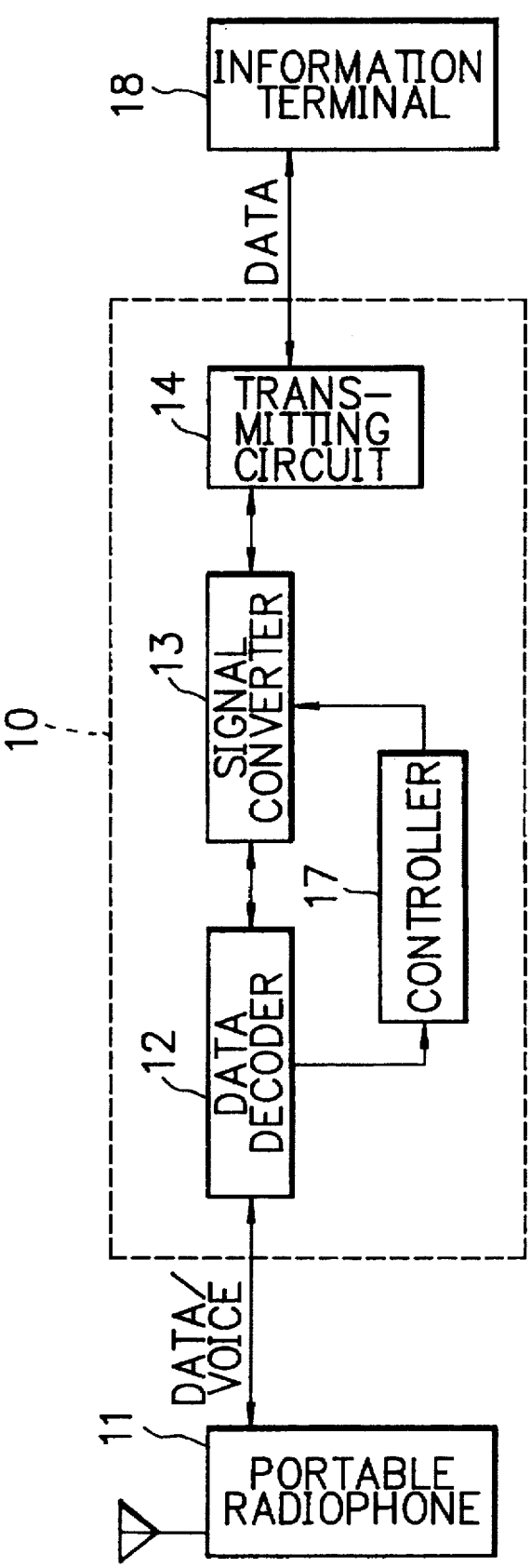
FIG. 1 is a schematic block diagram showing an example of the modem card for a portable radiophone in accordance with a conventional technology.

Next, description will be given in detail of an embodiment of the modem card for a portable radiophone in accordance with the present invention. FIG. 2 shows an embodiment of the modem card 20 for a portable radiophone in accordance with the present invention in which the modem card 20 is connected to a portable radiophone 21 and an information terminal 28.

In the configuration of the modem card 20 of FIG. 2, a signal from the radiophone 21 is received as an input thereto to produce therefrom two signals including a data signal and a voice signal. In the internal structure of the card 20, the signal received from the radiophone 21 is supplied in parallel to a data decoding circuit 22 and a voice decoding section 25. The data decoder 22 creates an output signal to be fed via a signal converting section 23 and a transmitter circuit 24 to the information terminal 28. On the other hand, the voice decoder 25 generates an output signal, which is delivered via a digital-to-analog (D/A) converter circuit 26 to the terminal equipment 28.

The data decoder 22 is a circuit which decodes a data signal portion of the communication information signal from the radiophone 21. There is also included a data signal sensing section 29 for deciding whether or not the data signal decoded by the data decoding section 22 is a normal data signal. Also included in the system is a control circuit 27 which is responsive to a result of decision from the data signal sensor 29 to output to the signal converter 23 only the normal data signal contained in the decoded signals from the data decoder 22. Namely, the other signals are not sent to the signal converter section 23. In the converter 23, the structure of decoded data signal from the data decoder 22 is transformed. For example, there is carried out an operation to remove control signals from the received data signals. The transmitting circuit 24 is a so-called input/output section, namely, the converted signal from the signal converter 23 is received from and delivered to the information terminal 28.

In the modem 20, the communication information signal from the portable radiophone 21 is connected in parallel to the data decoder 22 and voice decoder 25. The voice decoding section 25 is a circuit to decode voice signals contained in the received communication information signal. The system further includes a voice signal sensing circuit 30 for deciding whether or not the voice signal decoded by the voice decoding circuit 25 is a normal voice signal. Receiving a result of decision from the voice signal sensing circuit 30, the controller 27 outputs to the D/A converter 26 only the normal voice signal contained in the decoded signals from the voice decoder 25. The other signals are not supplied to the D/A converter section 26. The normal voice signal converted by the voice decoder 25 is transformed by the D/A converter 26 from a digital signal into an analog signal to be outputted to the information terminal 28.

Incidentally, determination for the normal data or voice signal is accomplished on the basis of, for example, recognizable or changes in a frequency band and/or amplitude of the signals.

The normal data and voice signals are thus delivered to the information terminal 28. The control circuit 27 is connected via control lines to the data decoder 22, signal converter 23, transmitting circuit 24, voice decoder 25, D/A converter 26, data signal sensor 29, and voice signal sensor 30.

The control section 27 is a circuit to supervise, for example, operations of outputting the decoded data and voice signals. The signal supplied from the radiophone 21 is a composite signal including voice and data signals. In the modem card 20, the controller 27 achieves a control operation such that the composite signal is decoded by the decoding circuit section.

The modem card 20 constituted as above receives from the radiophone 21 a communication information signal including data information and voice information. The signal from the radiophone 21 is sent to the data decoding circuit 22 to a accomplish an operation to decode data signals of, for example, the Bose-Chudhuri-Hocquenghem code system. Results of the decoding operation are sensed by the data signal sensor 29. The controller 27 passes normally decoded signals to the single converter 23. The structure of the received signals are converted by the converter 23 and the resultant signals are fed to the transmitter 24. The signals are then sent to the terminal 28 in a format conforming to the terminal 28. If there are missing normally decoded signals, the control circuit 27 conducts a control operation such that the pertinent data signal is not delivered to the signal converter 23. Namely, any signals other than the normal data signals are not sent to the information terminal 28. Moreover, the communication information signal from the radiophone 21 is also transmitted to the voice decoder 25 at the same time so as to carry out an operation to decode voice signals according to, for example, the VSELP system. Signals resultant from the decoding operation is sensed by the voice signal sensor 30. The controller 27 allows normally decoded signals to enter the D/A converter 26 such that the signals are converted from digital signals into analog signals (voice signals) so that the information terminal 28 produces voices. In the situation, if normally decoded signals are missing, the control circuit 27 achieves a control operation such that the pertinent voice signals are not delivered to the D/A converter 26. Therefore, any signals other than the normal voice signals are not fed to the information terminal 28.

In the data and voice decoding circuits 22 and 25 connected in parallel to the composite signal, an output signal from the decoding circuit conforming to the signal type of the input signal is assumed to be effective so as to prevent signals from being outputted from the remaining decoding circuit not conforming thereto, thereby outputting appropriate signals. In the information terminal 28, while processing data other than voices, the voice signals are directly fed to a speaker or the like integrally disposed therein, thereby reproducing original voices.

In the embodiment in accordance with the present invention, data and voice signals contained in communication information from the portable radiophone 21 are simultaneously decoded in the modem card 20 such that the data and voice signals are fed to the information terminal 28 at the same time. As a result, the change-over operation conventionally accomplished by the terminal 28 becomes unnecessary. In the terminal 28, the data signal is subjected to the data processing and the voice signal is connected to an external speaker or the like so that voices of the communication partner are received during communication of data.

In accordance with the present invention, voice and data signals are concurrently processed so as to select a normal signal from the decoded signals, which makes it possible to process different types of signals at a high speed. With this provision, there will be facilitated a complex communication of data and voice signals in a time-sharing fashion in which data signals are inserted into, for example, a free-time zone during communication of voices.

Furthermore, it is unnecessary for the information terminal 28 to include circuits for decoding data and voice signals and hence the circuit configuration of the terminal 28 is simplified. Resultantly, the design and manufacturing of the terminal 28 are also facilitated; consequently, the system can easily cope with increase in the amount of information.

In a modem card for use with a portable radiophone in accordance with the present invention, a signal of a data portion contained in a communication information signal from a portable radiophone is decoded such that the decoded signal is decided to be a normal data signal so as to send only the normal data signal to the information terminal. Moreover, a voice signal of the communication information signal produced from the portable radiophone is decoded and then the decoded signal is decided to be a normal voice signal so as to transmit only the normal voice signal to the information terminal. In consequence, when processing the communication information signal including data and voice signals, the data and voice can be concurrently decoded by one modem card without conducting the operation in which the data signal is discriminated from the voice signal to effect a change-over operation for decoding means. Since the selection and change-over of voice and data signals are accomplished at a high speed, the system can flexibly cope with communication of complex signals including both voice and data signals.

While the present invention has been described with reference to the particular illustrative embodiments, it is not to be restricted by those embodiments but only by the appended claims. It is to be appreciated that those skilled in the art can change or modify the embodiments without departing from the scope or the spirit of the present invention.

What is claimed is:

1. A modem card for use with a portable radiophone connected between a portable radiophone and an information terminal for decoding a communication information signal from the portable radiophone and outputting the decoded signal to the information terminal, comprising:

data decoding means for receiving the communication information signal generated from the portable radiophone and decoding a data signal contained therein;

data signal sensing means for receiving said data signal and deciding whether or not the data signal decoded by the data decoding means is a recognizable data signal;

control means for delivering only a signal decided to be the recognizable data signal by the data signal sensing means from the data decoding means to the information terminal;

voice signal decoding means for receiving the communication information signal generated from the portable radiophone and decoding a voice signal contained therein;

voice signal sensing means for receiving said voice signal and deciding whether or not the voice signal decoded by the voice decoding means is a recognizable voice signal; and control means for delivering only a signal decided to be the recognizable voice signal by the voice signal sensing means from the voice decoding means to the information terminal, whereby the modem card decodes the data and voices.

2. A modem card as claimed in claim 1, further comprising signal converting means for converting structure of the recognizable data signal delivered from the data decoding means.

3. A modem card as claimed in claim 2, further comprising signal transmitting means for outputting to the information terminal the data signal of which structure is converted by a signal converting means.

4. A modem card as claimed in claim 1, further comprising digital-to-analog converting means for converting the recognizable voice signal generated by the voice signal decoding means into an analog signal.

* * * * *